United States Patent [19]

Domenichini

[11] Patent Number: 4,752,062

[45] Date of Patent: Jun. 21, 1988

[54] SUSPENSION FOR VEHICLES, WITH INTERDEPENDENT HYDRAULIC SHOCK ABSORBERS

[75] Inventor: Gilberto Domenichini, Asti, Italy

[73] Assignee: Face Standard, Milan, Italy

[21] Appl. No.: 2,176

[22] Filed: Jan. 12, 1987

[51] Int. Cl.$^4$ ............................................. B60G 21/06
[52] U.S. Cl. .................................. 267/186; 188/299; 188/315; 188/322.14; 267/64.16; 280/6.11; 280/714
[58] Field of Search ...................... 280/6.11, 6.1, 6 H, 280/6 R, DIG. 1, 703, 702, 711, 714, 708; 267/186, 187, 184, 185, 64.11, 64.16–64.21, 183–191; 188/322.14, 322.19, 281, 315, 284, 285, 299, 318, 319, 105

[56] References Cited

U.S. PATENT DOCUMENTS

| | | | |
|---|---|---|---|
| 3,090,611 | 5/1963 | Schultze | 267/186 |
| 3,328,019 | 6/1967 | Wilson | 267/64.16 X |
| 3,736,000 | 5/1973 | Capgras | 267/64.16 X |
| 4,172,588 | 10/1979 | Ganoung | 267/186 |
| 4,411,447 | 10/1983 | Hart | 267/186 X |
| 4,506,751 | 3/1985 | Stephens | 280/703 X |

Primary Examiner—Douglas C. Butler
Attorney, Agent, or Firm—James B. Raden; Robert P. Seitter

[57] ABSTRACT

A suspension for a vehicle including two hydraulic shock absorbers interconnecting respective remote zones of the suspended part of the vehicle to respective non-suspended parts. Each shock absorber is of the twin tube type with a compensation chamber which communicates with a lower chamber of the cylinder by way of a communication duct formed in a valve-containing endpiece. Inside the duct there are arranged a compression valve which allows the shock absorber fluid to flow towards the compensation chamber during contraction of the shock absorber and between the compression valve and the compensation chamber. A shut-off valve which is normally open is operated in the closing direction by a pilot pressure. The upper chamber of each shock absorber is connected by a respective hydraulic tube to a chamber controlling the shut-off valve of the other shock absorber. The shut off valve closes when the pressure exceeds a predetermined threshold.

7 Claims, 3 Drawing Sheets

SUSPENSION FOR VEHICLES, WITH INTERDEPENDENT HYDRAULIC SHOCK ABSORBERS

BACKGROUND OF THE INVENTION

The present invention relates to a suspension system for vehicles and more particularly to a suspension in which two similar hydraulic shock absorbers respectively connect different portions of the suspended part of the vehicle to respective non-suspended parts. In still greater particularity, each shock absorber is of the type which includes a cylinder delimited at its top by an annular cylinder head and at its bottom by a fixed valve-containing body. Inside the cylinder of each shock absorber there is slidably mounted a valve-containing piston which divides the cylinder into an upper chamber and a lower chamber and to which a rod extending through the upper cylinder head is rigidly fixed. Each shock absorber also includes a compensation chamber which communicates hydraulically with the lower chamber of the cylinder by way of the valve-containing body. This communication is controlled by automatic compression and compensation valves incorporated in the valve-containing body. The two shock absorbers are interconnected by hydraulic tubes such that, when the two shock absorbers are working in opposite directions, an extension of one causes an increase in resistance to compression of the other.

Suspensions of this general type are used to limit roll on heavy vehicles and on vehicles where the center of gravity is high. Examples of road vehicles of this kind are buses and large delivery vans. In these applications, the interconnected shock absorbers are associated with the opposite wheels of a common axle of the vehicle.

Another example of a vehicle where it is advantageous to use such a suspension is on a railway carriage. In this case the interconnected shock absorbers are arranged, on both sides of the carriage, between the suspended part and the non-suspended part of the carriage.

The systems used heretofore to limit the rolling action of a vehicle using shock absorbers are based on the principle of a direct crossed connection between the upper and lower chambers of each working cylinder of the two shock absorbers. A system of this kind is illustrated and described, for example, in the document IT-A-1,032,551.

In this known system, the oil in the shock absorber, which is compressed between the piston and the annular cylinder head or upper end during extension of one of the shock absorbers, is conveyed into the lower chamber between the piston and the compression valve of the other shock absorber which at the same time is being compressed. This oil flow opposes the compressive movement, thereby increasing the rolling resistance of the entire suspension.

However, this known system has certain shortcomings with regard to the tubes for connecting the shock absorbers which must be able to withstand high rates of flow under considerable pressure. Also, the tubes must be able to withstand radial deformation, so as not to introduce elasticity into the damping system. A further problem concerns the requirement for a special calibration procedure of the valves in order to avoid an imbalance in the oil flow under in all conditions.

SUMMARY OF THE INVENTION

The object of the present invention is to provide a suspension system of the type mentioned which overcomes these shortcomings and which is simplified particularly in regard to adjustment and calibration.

According to the present invention, this object is achieved by means of a suspension wherein the valve-containing body of each shock absorber includes a duct for establishing hydraulic communication between the lower chamber of the cylinder and the compensation chamber. Inside the duct there is arranged a compression valve which allows the hydraulic fluid to flow from the lower chamber to the compression chamber during compression of the shock absorber and located between the compression valve and the compensation valve there is a normally open shut-off valve which can be operated in the closing direction by a pilot pressure.

According to another important aspect of the invention, hydraulic tubes interconnect, respectively, the upper chamber of one of the shock absorbers to a chamber of the other shock absorber which controls the shut-off valve of that other shock absorber, so as to actuate the shut-off valve in the closing direction by means of the pressure inside the upper chamber of the one shock absorber.

The invention has been developed for application to an anti-roll system for heavy road vehicles with a high center of gravity. However, it can also be applied, for anti-roll purposes, to railway carriages. Moreover, the system according to the invention can also be applied to obtain an anti-pitching effect in a road vehicle, for example in order to avoid excessive lowering of the front part of the vehicle during braking. In this case, on each side of the vehicle, one of a pair of interconnected shock absorbers would be associated with the front wheel and the other with the rear wheel of the vehicle.

According to the invention, the anti-roll or anti-pitching effect is obtained by throttling the valves which regulate the oil flow during compression, without the transfer of oil from one shock absorber to the other. Thus, the need for using tubes with large cross-section is eliminated since there is no flow of oil from one shock absorber to the other. At the same time, the requirement that the tubes be highly resistant to radial deformation is resolved, since a tube with a small cross-section is, by its very nature, radially stronger that a tube with a large cross section.

BRIEF DESCRIPTION OF THE DRAWINGS:

The invention will be more clearly understood by reading the detailed description which follows, with reference to the attached drawings in which.

DETAILED DESCRIPTION OF THE PREFERRED EMBODIMENT

Figure 1:
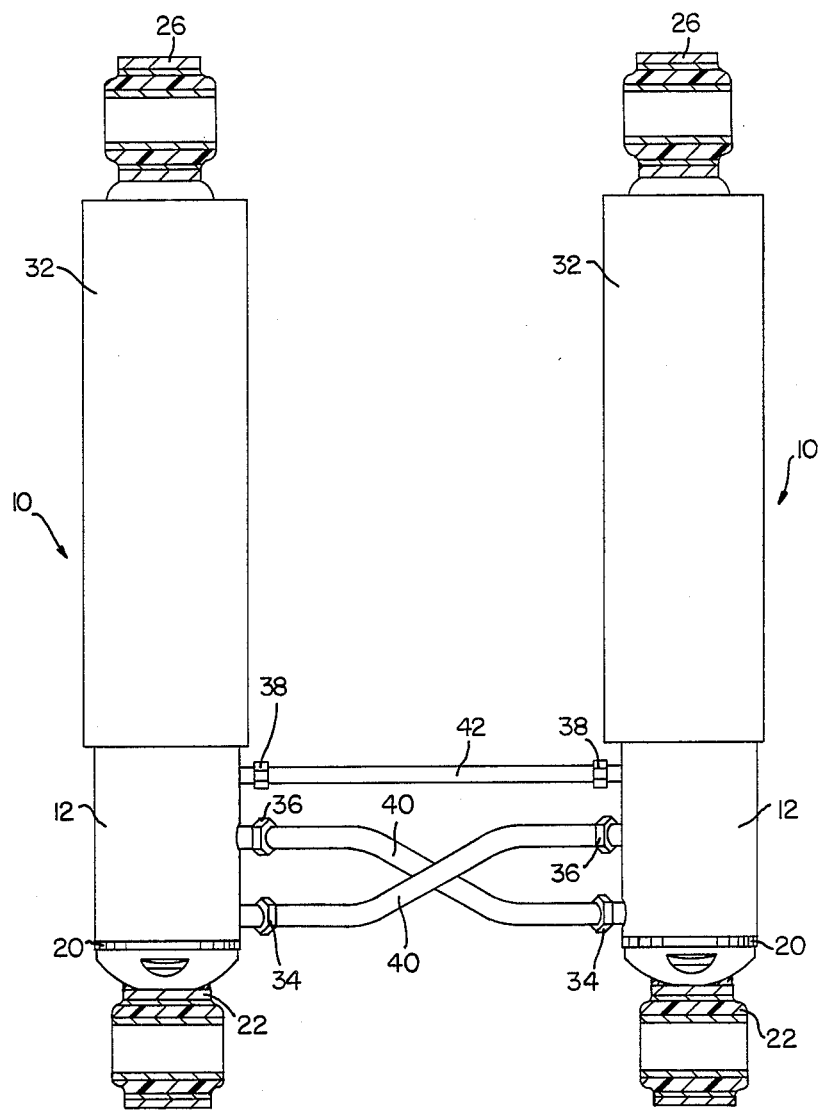
FIG. 1 is a schematic view of an anti-roll suspension for use with an axle of a road vehicle.

Shown in FIG. 1 is a portion of a suspension system according to the invention including two shock absorbers 10 adapted to be mounted at the two ends of a common axle (not shown) of a vehicle, for example in the region of the right-hand and left-hand wheels of a rear axle.

Figure 3:
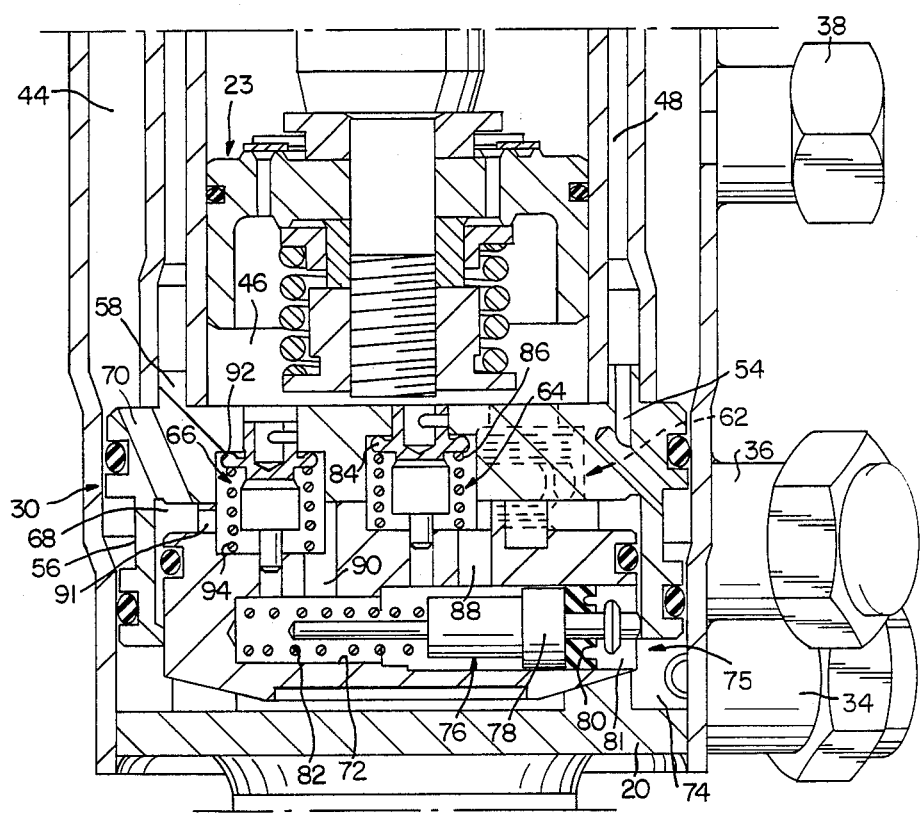
FIG. 3 is an enlarged vertical cross-section of the lower portion of the shock absorber according to the invention in which the shut-off valve which forms part of the invention is shown in the open position.
Figure 4:
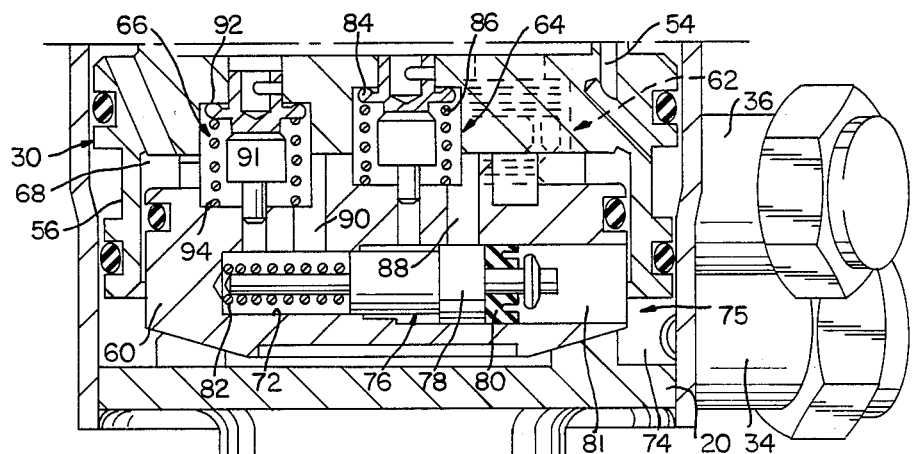
FIG. 4 is an enlarged cross-section similar to that of FIG. 3, showing the shut-off valve in the closed position.

The two shock absorbers 10 are of the "twin tube" type and are identical to each other. Details of the shock absorber construction is shown in FIGS. 2, 3 and 4.

Figure 2:
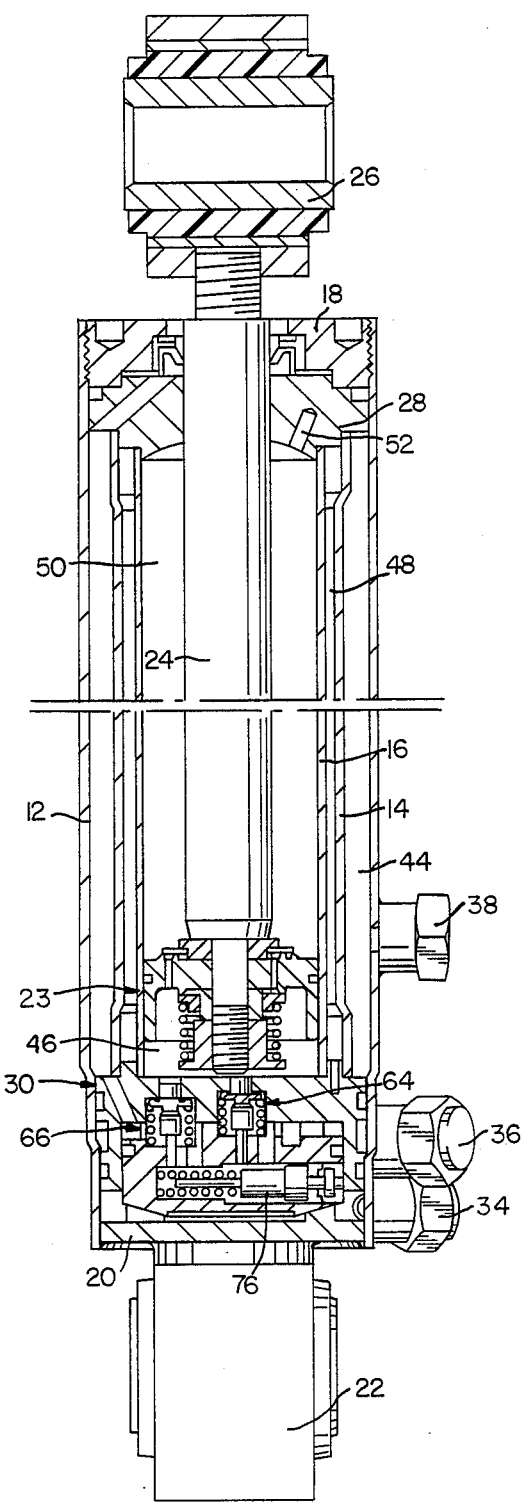
FIG. 2 is a cross-section of one of the shock absorbers of the suspension of FIG. 1.

With reference to FIGS. 1 and 2, each shock absorber includes a body or outer tube 12, a middle tube 14 and an inner tube 16, which are coaxial with each other. The inner tube 16 constitutes the cylinder of the shock absorber.

The outer tube 12 is sealed at the ends by an annular upper endpiece 18 and by a disk-shaped lower endpiece 20.

The lower endpiece 20 is provided with a bush-type attachment 22 for connection to the non-suspended part of the vehicle, such as the axle, in the vicinity of the wheel.

Inside the inner tube or cylinder 16 there slides a valve-containing piston 23, of a known type, the details of which are not described. Rigidly fixed to the piston 23 is a rod 24 which extends in a sealed manner through the upper cylinder head 18 and which has at its upper end a bush-type attachment 26 for connection to the suspended vehicle body.

An annular cylinder head 28, through which the rod 24 extends, is associated with the upper endpiece 18. A valve-containing body 30, the details of which will be described below, is associated with the lower endpiece 20.

The middle tube 14 and the inner tube 16 are connected at their ends to the cylinder head 28 and the body 30 respectively.

Each shock absorber 10 is completed by a tube or dust-protection cover 32, which is fixed to the upper end of the rod 24 together with the attachment 26.

As can be seen in the Figures, the body or outer tube 12 is provided, near its lower end with three pipe unions, indicated in succession from the bottom upwards by the numerals 34, 36 and 38, the functions of which are explained below.

The pipe union 34 of each shock absorber is connected to the pipe union 36 of the other shock absorber by a corresponding pressure-tight flexible tube 40. The two pipe unions 38 are interconnected by another pressure-tight tube 42.

Between the outer tube 12 and the middle tube 14 there is defined an annular interspace 44 which constitutes the well-known compensation chamber of a twin tube shock absorber. This compensation chamber 44 is connected, by means of the valve-containing body 30 and in the manner which is described below, to a lower chamber 46 defined, inside the cylinder 16, between the piston 23 and the body 30.

The middle tube 14, which does not exist in the conventional twin-tube shock absorber, defines an annular duct 48 between itself and the inner tube 16. An upper chamber 50, defined inside the cylinder 16 between the piston 23 and the annular cylinder head 28, communicates at the top with the annular duct 48 by way of an elbow passage 52 in the form of holes bored in the cylinder head 28.

As shown more clearly in FIG. 3, the annular duct 48 communicates at the bottom with the union 36 through an elbow passage 54 in the form of holes bored in the valve-containing body 30 and through a peripheral groove 56 also formed in the body 30.

Still referring to FIG. 3, the valve-containing body 30 includes two parts, the upper one of which 58 is in the form of an upturned cup and the lower one of which 60 is inserted in sealed fashion inside the part 58, clamped between the upper part and the endpiece 20. Cavities are formed in the two parts 58 and 60 of the valve-containing body 30 and hold three valves 62, 64 and 66, which are described below.

An annular space 68 is defined between the two parts 58 and 60 of the valve-containing body 30 and communicates with the interspace or compensation chamber 44 through a passage 70 provided in the part 58.

The valve 62, shown in broken lines since it is not located in the sectional plane of FIG. 3, is an automatic compensation valve which opens so that the compensation chamber 44 communicates with the lower chamber 46, in a known manner, during extension of shock absorber.

A diametral crylindrical cavity 72 with a blind bottom is formed in the lower part 60 of the body 30 and, at its end opposite the bottom, leads into a lower annular space 74 defined between the parts 58 and 60 of the valve-containing body 30 and the endpiece 20. This space 74 communicates, in turn, with the union 34.

The cavity 72 constitutes the cylinder of a slide valve, which is denoted in its entirety by 75 and the cylindrical slide of which is indicated by 76. The slide 76 has an obturator collar 78 with which a lip gasket 80 is associated, the latter delimiting a control chamber 81 communicating with the space 74 and the union 34.

A calibrated helical buffer spring 82 lies between the other end of the slide 76 and the bottom of the cavity 72, as a result of which spring the valve 75 is normally open.

The valve 64 is a compression valve designed to open during contraction of the shock absorber. The valve 64 includes an obturator disk 84 biased by a calibrated spring 86. Downstream of the disk 84, a communication duct including two passages 88 and 90 located alongside each other serves to establish communication between the lower chamber 46 and the annular space 68 and compensation chamber 44 when the valve 64 is open. The two passages 88 and 90 are formed in the lower part 60 of the body 30 and both lead into the cavity 72 in such a way that the communication duct intersects this cavity. The inlet of the passage 90 is open whatever the position of the slide 76, while the outlet of the passage 88 can be closed by the collar 78 when, as shown in Figure 4, the shut-off slide valve 75 is shut. The passage 90 communicates with the annular space 68 by way of the chamber of the valve 66 and a lateral passage 91.

The valve 66 is an auxiliary compression valve arranged hydraulically in parallel with the main compression valve 64. Its obturator disk, indicated by 92, is biased by as helical spring 94 which is more rigid than the spring 86 of the main valve 64. The chamber of the valve 66, downstream of the obturator 92, communicates at all times with the annular space 68 and with the interspace 44 through the lateral passage 91.

The operation of each shock absorber considered individually will now be described.

During compression, hydraulic oil in the shock absorber is made to pass through the main compression valve 64, which is rather "soft", and is conveyed to the compensation chamber 44 through the communication ducts 88, 90, the lateral passage 91, the annular space 68 and the passage 70.

Under this condition, the viscous resistance of the shock absorber is a function of the resistance to the flow of oil offered by the main valve 64.

During extension, the oil is made to pass from the upper chamber 50 to the lower chamber 46 by way of the members for regulating braking of the valve-containing piston 23.

At the same time, the annular duct 48 is pressurized by the passage 52. This pressure is transmitted to the tube 40 through pipe union 36 via the passage 54 and the groove 56.

Joint operation of the two shock absorbers 10 will now be described.

When both of the wheels of the portion of the suspension with which the shock absorbers are associated are subjected to jerking, the shock absorbers perform the same movements at the same time. Compression does not differ from that described above for the single shock absorber.

During extension, the pressure applied to the pipe union 36 of each shock absorber is transferred, through the respective tube 40, to the pipe union 34 of the other shock absorber. The oil under pressure, inside the other shock absorber, then moves the slide 76 against the force of the spring 82. The collar 78 then interrupts the flow of oil from the passage 88 to the passage 90 blocking the main compression valve 64.

However, since during the jerking motion both the shock absorbers are extended or compressed at the same time, closing of the shut-off valve 75 does not influence the operation of the shock absorber, since the latter at that moment is being extended and the flow of oil inside the valve-containing body 30 occurs through the compensation valve 62.

Operation of the two shock absorbers during rolling will now be described.

In this case, the shock absorbers are in opposition with each other, that is when one is extended, the other is compressed.

The shock absorber being extended operates in the manner described above.

In the shock absorber being compressed, the main compression valve 64 is blocked by the shut-off valve 75, which is closed, as shown in FIG. 4, owing to the pilot pressure which reaches the control chamber 81 from the upper chamber 50 of the other shock absorber being extended. The auxiliary compression valve 66 then opens, in order to prevent total blockage of the shock absorber. In practice, the shock absorber passes from a state where it is softer to a state where it is more rigid and hence its damping force during compression when rolling occurs is greater than that during compression when jerking occurs.

Adjustment of the additional compression valve 66 is, as will be understood, independent of that of the main compression valve 64. Calibration of the spring 94 may be chosen as preferred and in accordance with requirements.

In the embodiment shown, the shut-off valve 75, which is operated by the pilot pressure, works either completely or not at all. Alternatively, in a simpler embodiment, the auxiliary compression valve 66 could be eliminated and in order to prevent total blockage of the shock absorber during compression and in conditions where rolling occurs, it could be arranged so that the collar or the slide or other obturator of a shut-off valve does not completely block the communication duct 88, but throttles it by a predetermined amount.

With the passing of time a slight loss of oil from the control chamber 81, around the gasket 80, is inevitable. This loss is undesirable owing to the fact that it can lead, in the long term, to the transfer of one, at the expense of the other.

In order to overcome this drawback, the suspension is preferably provided with the communication tube 42 which, interconnecting the union 38, also interconnects the compensation chambers 44 in order to obtain a balance of oil between the two shock absorber.

As can be seen in the drawings, all the pipe unions 34, 36, and 38 are situated on the lower part of the shock absorbers 10. This arrangement is quite normal for the pipe unions 34 and 38, whereas in the case of the pipe union 36 it is obtained as a result of the annular duct 48, all of which is achieved in such a way that the pipe unions do not interfere with the dust-protection cover or tube 32.

The invention is applicable to suspensions provided with shock abosrbers different from those of the "twin tube" type shown in the drawings, provided that they are of a type which have a compensation chamber. For example, the invention is applicable to "Alliquant" type shock absorbers, where the compensation chamber is situated at the bottom of the valve-containing body.

What is claimed is:

1. A suspension for a vehicle, comprising two hydraulic shock absorbers each interconnecting different remote suspended parts of the vehicle to respective non-suspended parts of the vehicle, each said shock absorber of a type including a cylinder delimited at a top thereof by an annular cylinder head and at a bottom thereof by a fixed valve-containing body, a valve-containing piston slidably mounted in said cylinder which divides up the cylinder into an upper chamber and into a lower chamber, a rod extending through the annular cylinder head rigidly fixed to said piston, each shock absorber further including a compensation chamber which communicates with the lower chamber of the cylinder by way of the valve-containing body, said communication being controlled by an automatic compression valve and an automatic compensation valve incorporated in the valve-containing body, said two shock absorbers hydraulically interconnected by at least two hydraulic tubes such that, when the two shock absorbers are working in opposite directions, an extension of one of said shock absorbers corresponds to an increase in braking of the compression of the second one, said valve-containing body includes at least one main communication duct for establishing hydraulic communication between the lower chamber of the cylinder and the compensation chamber, a main compression valve arranged inside said main communication duct which allows hydraulic liquid to flow from the lower chamber to the compensation chamber during compression of each shock absorber and a normally open shut off valve between the compression valve and the compensation chamber operable in a closing direction by a pilot pressure, said at least two hydraulic tubes interconnect, respectively, the upper chamber of one of the shock absorbers to a chamber controlling the shut-off valve of the second shock absorber so as to actuate said shut off valve in the closing direction by means of a pressure in said upper chamber.

2. The suspension according to claim 1, wherein the valve-containing body further includes an auxiliary compression valve arranged inside the communication duct hydraulically in series with the shut-off valve and hydraulically in parallel with the main compression valve and with the shut-off valve, said auxiliary valve being calibrated to open only when the main communication duct is blocked by the shut-off valve.

3. The suspension according to claim 1, wherein in each shock absorber the shut-off valve is cylindrical slide valve which slides in a cylindrical cavity formed in the valve-containing body and which intersects the communication duct, a tube interconnecting with the upper chamber of the second shock absorber leads into the cylindrical cavity at one end of the slide and a second end of the slide is acted on by a spring which forces back the slide into a position where the communication duct is unobstructed.

4. The suspension according to claim 1, wherein each shock absorber is of the type including an inner tube which defines the cylinder and a coaxial outer tube which delimits externally a compensation chamber, between the inner and the outer tubes there is arranged a middle coaxial tube which extends between the annular cylinder head and the valve-containing body and which defines between itself and the outer tube an annular interspace constituting the compensation chamber and between itself an the inner tube an annular duct, the upper chamber of the cylinder and the annular duct communicate with each other at the top of the shock absorber, the valve-containing body includes a passage establishing hydraulic communication between the annular duct and a first outer tube union of each shock absorber, each of said hydraulic tubes connect to a one of said outer tube unions on each shock absorber and to a second outer tube union on the respective other shock absorber hydraulically connecting directly to a control chamber of the shut-off valve of the respective other shock absorber.

5. The suspension according to claim 4, wherein the compensation chambers of the two shock absorbers are interconnected by a third hydraulic tube for balancing the oil level in the two shock absorbers.

6. The suspension according to claim 1 wherein the two shock absorbers are interconnected in order to limit roll of the vehicle.

7. The suspension according to claim 1 wherein the two shock absorbers are interconnected in order to limit the pitch of the vehicle.

* * * * *